United States Patent [19]

Ishikawa et al.

[11] Patent Number: 4,774,012
[45] Date of Patent: Sep. 27, 1988

[54] COBALT-CONTAINING FERROMAGNETIC IRON OXIDE POWDER AND PROCESS FOR PRODUCING THE SAME

[75] Inventors: Tatsuo Ishikawa; Kazutaka Fujii; Kenichi Sasaki, all of Yokkaichi; Mitsuo Suzuki, Suzuka, all of Japan

[73] Assignee: Ishihara Sangyo Kaisha, Ltd., Osaka, Japan

[21] Appl. No.: 3,624

[22] Filed: Jan. 15, 1987

[30] Foreign Application Priority Data

Jan. 30, 1986 [JP] Japan .................................. 61-19005

[51] Int. Cl.$^4$ .............................................. C04B 35/26
[52] U.S. Cl. .............................. 252/62.56; 252/62.62; 252/62.63; 252/62.64
[58] Field of Search ............... 252/62.56, 62.62, 62.63, 252/62.64; 423/594

[56] References Cited

U.S. PATENT DOCUMENTS 4,226,843 10/1980 Watanabe et al. ............... 252/62.56
4,336,242 6/1982 Schmidberger et al. ........... 423/594

FOREIGN PATENT DOCUMENTS 60-71529 4/1985 Japan .................................. 423/594

Primary Examiner—Jack Cooper
Attorney, Agent, or Firm—Cushman, Darby & Cushman

[57] ABSTRACT

A cobalt-containing ferromagnetic iron oxide powder of which constituent particles each is an aggregate of cobalt-containing ferromagnetic iron oxide micorparticles and has a spherical shape of 5 to 200 μm in diameter has an angle of repose of 35° or smaller and accordingly excellent flowability, as well as to a process for producing the iron oxide powder, are provided. This ferromagnetic iron oxide powder consisting of spherically shaped particles, are easily dispersed in an organic binder to return to the original state of microparticles, and provide improved magnetic characteristics when used as a material for magnetic recording media such as a magnetic tape and the like.

12 Claims, 3 Drawing Sheets

X 30000

X 40

X 40

4,774,012

COBALT-CONTAINING FERROMAGNETIC IRON OXIDE POWDER AND PROCESS FOR PRODUCING THE SAME

BACKGROUND OF THE INVENTION

1. Field of the Invention

The present invention relates to a cobalt-containing ferromagnetic iron oxide powder having improved dispersibility particularly in an organic binder and very useful as a recording material for magnetic recording media.

2. Description of the Prior Art

Cobalt-containing ferromagnetic iron oxide is characterized by having a high coercive force, enabling high density recording when used as a recording element of magnetic recording media and having an excellent sensitivity in a high frequency range. Therefore, said iron oxide is in wide use in the field of magnetic recording media such as videotape and the like.

As a recent trend, with the use of magnetic recording media (e.g. videotape) of higher quality, the cobalt-containing ferromagnetic iron oxide used in such recording media as a recording element is moving toward finer particles. The magnetic powders of fine particles produced according to the conventional processes have problems in that as the particles become finer, uniform dispersion of the particles in an organic binder when the particles are kneaded with the binder to make a magnetic coating becomes more difficult and resultantly the intended purpose of obtaining a magnetic recording medium of improved magnetic characteristics by using a magnetic powder of finer particles cannot be achieved.

In the recent production of magnetic recording media, it is important in order to allow such media to have excellent magnetic characteristics that a magnetic powder of high coercive force be highly packed and highly oriented in the recording media, or a magnetic coating containing a uniformly dispersed magnetic powder be used to allow the magnetic recording media produced therefrom to have a surface of high smoothness. In order to achieve these requirements, it is necessary that the magnetic powder be disintegrated into nearly its primary particles without destroying the powder particles when a magnetic coating is prepared from the powder. With the magnetic powders produced according to the conventional processes, however, the primary particles tend to aggregate to form agglomerates and thus disintegration of the powders into nearly their primary particles at the time of magnetic coating preparation is difficult.

In order to solve the above problems, various proposals have been made. For example, there have been tried an approach of coating the particle surfaces of a magnetic powder with, for example, a surfactant having good compatibility with a binder used together with the powder, prior to the preparation of a magnetic coating from the powder and the binder [Japanese Patent Kokoku (Post-Exam. Publn.) No. 19120/1978 and Japanese Patent Kokai (Laid-Open) Nos. 37297/1979, 141196/1978, 82354/1979 and 85397/1979], an approach of using a surfactant as a dispersing agent at the time of preparation of a magnetic coating [Japanese Patent Kokai (Laid-Open) Nos. 151068/1980 and 151069/1980] and an approach of disintegrating agglomerates of magnetic powder particles using a mechanical means, at the time of preparation of a magnetic coating [Japanese Patent Kokai (Laid-Open) Nos. 22297/1975, 157216/1980 and 10903/1981].

However, these approaches have drawbacks in that the surfactant is not effective for its selectivity for binder resin, in that the magnetic tapes produced have a reduced strength or cause bleeding or fall-off of powder (which means a phenomenon wherein the magnetic powder contained in the tapes is peeled off when the tapes are rubbed), and in that the particles obtained by mechanical dispersion cause reaggregation depending upon the degree of the dispersion. These drawbacks are larger when the particles of magnetic powder are finer, making very difficult the improvement of dispersibility of finer particle magnetic powder.

The processes for producing a cobalt-containing ferromagnetic iron oxide powder by allowing a cobalt compound to adhere to the particle surfaces of a magnetic iron oxide powder include, after the adhesion of the cobalt compound, a drying step using a dryer. This dryer is ordinarily a through flow chamber dryer, a fluidized bed dryer, a through flow rotary dryer, etc. To this date, there has been made no attempt to enhance the dispersibility of a magnetic iron oxide powder through the improvement of the drying step. The present inventors made extensive research in order to solve the previously mentioned drawbacks of the conventional processes for producing a cobalt-containing iron oxide powder and, as a result, found that the use of a spray dryer in the above drying step enables the production of a cobalt-containing ferromagnetic iron oxide powder of very excellent dispersibility whose particles are each an aggregate of cobalt-containing ferromagnetic iron oxide microparticles and has a spherical shape of 5 to 200 μm in diameter and which can be easily disintegrated, at the time of production of a magnetic recording medium, into nearly the state of the primary particles before aggregation. This has led to the completion of the present invention.

SUMMARY OF THE INVENTION

The objects of the present invention are to provide a cobalt-containing ferromagnetic iron oxide powder which has solved the above mentioned drawbacks of the prior art, has excellent dispersibility and is useful as a magnetic recording material, as well as a process for producing said powder.

The present invention firstly relates to a cobalt-containing ferromagnetic iron oxide powder whose constituent particles are each an aggregate of cobalt-containing ferromagnetic iron oxide microparticles having a specific surface area of 30 m$^2$/g or larger when measured in accordance with the BET method and have a spherical shape of 5 to 200 μm in diameter and whose angle of repose as a measure of the flowability of powder is at a particular level. The present invention secondly relates to a process for producing a cobalt-containing ferromagnetic iron oxide powder wherein, after metal compounds including at least a cobalt compound have been allowed to adhere to the particle surfaces of a magnetic iron oxide powder, the drying of the resulting iron oxide powder is conducted by spray drying.

BRIEF DESCRIPTION OF THE DRAWINGS

In FIG. 2, curve 1 shows the case of the magnetic powder of Example 1 and curve 2 the case of the magnetic powder of Comparative Example 1.

DETAILED DESCRIPTION OF PREFERRED EMBODIMENTS

Figure 1:
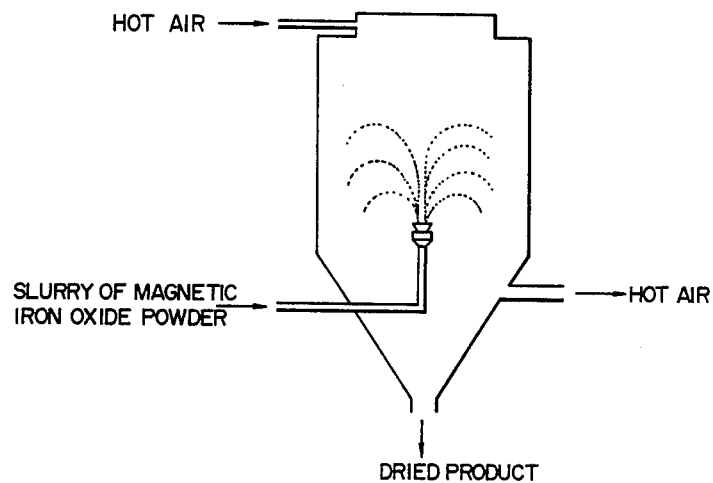
FIG. 1 is a sectional view showing an example of spray dryers.

The cobalt-containing ferromagnetic iron oxide microparticles having a specific surface area of 30 m$^2$/g or larger when measured in accordance with the BET method can be produced according to various processes. Ordinarily, they are produced by treating a magnetic iron oxide powder [e.g. maghemite ($\gamma$-Fe$_2$O$_3$), magnetite (Fe$_3$O$_4$), Bertholide compound (FeO$_x$, 1.33 < X < 1.5)] with a cobalt salt and an alkali or with a cobalt salt, other metal salt(s) and an alkali in an aqueous liquid medium to allow the cobalt and other metal compounds to adhere to the particle surfaces of the powder and then subjecting the resulting magnetic iron oxide particles to filtration, water washing and, as necessary, a heating treatment. The microparticles typically are acicular crystals and have an average particle diameter (the length of major axis) of 0.08 to 0.3 $\mu$m, an axis ratio of 3 to 15 and a specific surface area of 30 to 70 m$^2$/g, preferably 35 to 70 m$^2$/g. The microparticles can have other shapes such as a spindle shape, a rice shape and the like as long as their specific surface area is within said range. As the other metal salt(s), there can be mentioned salts of metals such as Fe$^{++}$, Mn, Zn, V, Ba, Mg and the like.

The effects of the present invention which are described later are particularly obvious in cobalt-containing ferromagnetic iron oxide microparticles having the above mentioned specific surface area. The reason is presumed to be that as the specific surface area gets larger, the cohesive force among the particles gets larger, which greatly promotes aggregation among particles during drying. In the case of magnetic iron oxide particles having a small specific surface area (smaller than 30 m$^2$/g), sufficient aggregation of particles during drying does not take place: therefore, the effects of the present invention are not obtained to a satisfactory extent.

The cobalt-containing ferromagnetic iron oxide powder of the present invention retains a droplet shape and has a spherical shape of 5 to 200 $\mu$m in diameter formed by aggregation of cobalt-containing ferromagnetic iron oxide microparticles having a specific surface area of 30 m$^2$/g or larger when measured in accordance with the BET method. This powder has excellent flowability and its angle of repose used as a measure of the flowability of powder is 35° or smaller (measured using Powder Tester manufactured by Hosokawa Micron K.K.), which is substantially lower than those of similar powders obtained using an ordinary dryer such as a hot air circulation type dryer, a fluidized-bed dryer or the like. The angle of repose of the magnetic powder as a measure of its flowability is required to be 35° or smaller, preferably 30° or smaller. A magnetic powder having an angle of repose larger than 35° has poor dispersibility and moreover is inferior in magnetic characteristics such as squareness, orientability, etc. of magnetic recording medium produced therefrom. Further, such a powder is generally adhesive and tends to cause adhesion and choking in pneumatic conveyors, storage facilities, etc. and therefore is not desirable. The compressibility of magnetic powders occasionally used as another measure of their flowability appears to be 0.25 or below, desirably 0.20 or below.

The present invention provides a process for producing a cobalt-containing ferromagnetic iron oxide powder consisting of spherical particles, which comprises the following steps.

That is, the present invention provides a process for producing a cobalt-containing ferromagnetic iron oxide powder, wherein magnetic iron oxide particles are treated with a cobalt salt and an alkali or with a cobalt salt, other metal salt(s) and an alkali in an aqueous liquid medium to allow the metal compounds including at least the cobalt compound to adhere to the surfaces of said particles and then the resulting slurry of cobalt-containing magnetic iron oxide particles is filtered, water-washed, heated as necessary and dried to obtain a cobalt-containing ferromagnetic iron oxide powder, characterized in that said drying is conducted by spray drying with hot air.

Spray dryers are apparatuses wherein a liquid material in such a form as a solution, a colloid, a paste, a slurry or the like is atomized and contacted with a hot gas current to conduct drying in a period of seconds. There are various types of spray dryers, depending upon how the hot gas and the droplets of the liquid material are contacted or how the atomization of the liquid material is made. Any type of spray dryer can be used in the present invention. The sectional view of an example of the spray dryers is shown in FIG. 1.

The concentration of magnetic iron oxide in the slurry to be fed to the spray dryer has no particular restriction because the atomization of the slurry can be conducted with a pressure nozzle or a disk type atomizer depending upon the properties of the slurry. However, the concentration is ordinarily 30 to 400 g/l, desirably 150 to 300 g/l. When the concentration of magnetic iron oxide is too high, pumping and atomization are affected adversely and the formation of droplets necessary for obtaining spherical particles becomes insufficient. When the concentration is too low for the purpose of water removal by drying, the economical efficiency becomes poor. Hence, a concentration of 150 g/l or higher is desirable for ordinary use in industry.

The appropriate discharge pressure used in atomization varies depending upon the type of atomizer, as well as on the type and capacity of pump for feeding the slurry. However, it is ordinarily about 2 to 30 kg/cm$^2$, desirably about 10 to 25 kg/cm$^2$.

The inlet temperature of hot air as a heat source for drying is ordinarily at least 150° C. When the dried product is collected by a bag filter, the upper limit of the outlet temperature of the hot air is specified in view of the heat resistance of the filter cloth used in the bag filter. Magnetic iron oxide, when heated to temperatures of 200° C. or higher during drying, tends to cause deterioration of magnetic characteristics and dispersibility. For these reasons, it is appropriate that the inlet temperature of the hot air be specified so that the outlet temperature does not exceed 200° C. Too low an outlet temperature is not preferable, because such outlet temperature excessively increases, the water content in dried product, which requires additional drying, and the additional drying causes destruction or deterioration of the condition of spherical particles and reduces the dispersibility improved by spray drying; and the overall drying efficiency is lowered. Hence, the outlet temperature of the hot air is ordinarily about 60° to 200° C., desirably about 70° to 200° C.

A magnetic powder having particle (spherical particle) diameters of 5 to 200 μm can be obtained by appropriately combining each range of the magnetic iron oxide concentration, the discharge pressure and the hot air outlet temperature depending upon the type and capacity of spray dryer used.

Air can be used as a drying atmosphere and a non-oxidizing atmosphere is not required particularly. A non-oxidizing atmosphere is required in some cases as a drying atmosphere for cobalt-containing ferromagnetic iron oxide but it is usually to prevent oxidation of $Fe^{++}$ in said iron oxide. Oxidation of $Fe^{++}$ hardly occurs in the present invention process presumably because of momentary drying. Therefore, the use of a non-oxidizing atmosphere is not required and drying can be conducted in air in the present invention process although the drying of magnetic iron oxide in an ordinary dryer requires a non-oxidizing atmosphere. The use of air is advantageous in cost.

The present invention, being constituted as above, has a number of excellent effects as follows.

(1) The magnetic powder of the present invention consists of spherical particles each formed by aggregation of primary particles of cobalt-containing ferromagnetic iron oxide due to a relatively weak cohesive force among the latter particles. Therefore, the powder is easily dispersed nearly to the state of the primary particles during preparation of a magnetic coating, whereby the dispersion time is reduced significantly. This leads to cost reduction in industrial operation.

(2) Magnetic recording media produced with the magnetic powder of the present invention show significant improvements not only in gloss of coating film but also in magnetic characteristics (e.g. squareness, orientability).

(3) The cobalt-containing ferromagnetic iron oxide powder of the present invention, having excellent flowability, has various advantages in its handling (powder handling). For instance, choking or bridge formation in feeders and feeding pipes can be prevented during powder transportation.

(4) While, in conventional magnetic iron oxide products, dispersibility is improved only slightly by applying a disintegration treatment after drying, the magnetic iron oxide powder of the present invention has excellent dispersibility by itself and requires no disintegration operation.

(5) While magnetic iron oxide requires a non-oxidizing atmosphere when dried in an ordinary dryer, the spray drying according to the present invention process requires no non-oxidizing atmosphere. This is advantageous in cost industrially.

Next, the present invention will be explained more specifically below by way of Examples. For clearer understanding, Comparative Examples are also shown.

The cobalt-containing ferromagnetic iron oxide (hereinunder referred briefly to as "magnetic iron oxide") used in Examples and Comparative Examples was obtained by forming, on a seed crystal of $\gamma$-$Fe_2O_3$ [average particle diameter (the length of major axis): 0.18μ, axis ratio: 8, Hc: 380 Oe, σs: 71 emu/g, specific surface area: 50 m²/g], a cobalt-containing magnetic iron oxide layer using (a) an aqueous solution of cobalt sulfate and ferrous sulfate and (b) an aqueous sodium hydroxide solution and then conducting filtration and thorough water washing. In this magnetic iron oxide, the contents of cobalt and $Fe^{++}$ were 3.5% and 3.7%, respectively, on a weight basis after drying.

EXAMPLE 1

An aqueous slurry containing 195 g/l of magnetic iron oxide was subjected to spray drying at a nozzle discharge pressure of 15 kg/cm² in a spray dryer (Model AN-12.5 CN/CR, manufactured by Ashizawa Niro atomizer Ltd.) wherein hot air stably had an inlet temperature of 300° C. and an outlet temperature of 100° C., whereby a magnetic powder (A) having a water content of 0.2% by weight and an average spherical particle diameter of about 85 μm was obtained.

EXAMPLE 2

The same procedure as in Example 1 was conducted except that hot air had an inlet temperature of 400° C. and an outlet temperature of 150° C., whereby a magnetic powder (B) having a water content of 0.1% by weight and an average spherical particle diameter of about 83 μm was obtained.

EXAMPLE 3

The same procedure as in Example 1 was conducted except that hot air had an inlet temperature of 250° C. and an outlet temperature of 75° C., whereby a magnetic powder having a water content of 5.0% by weight was obtained. This powder was subjected to supplemental drying at 120° C. in nitrogen gas using a through flow chamber dryer until the water content was reduced to 0.1% by weight, whereby a magnetic powder (C) having a water content of 0.1% by weight and an average spherical particle diameter of about 80 μm was obtained.

COMPARATIVE EXAMPLE 1

The same magnetic iron oxide slurry as used in Example 1 was filtered and converted to a cake. This cake was dried at 120° C. in nitrogen gas using a through flow chamber dryer, whereby a magnetic powder (D) having a water content of 0.1% by weight was obtained.

COMPARATIVE EXAMPLE 2

The same magnetic iron oxide cake as used in Comparative Example 1 was dried at 120° C. in nitrogen gas using a fluidized bed dryer, whereby a magnetic powder (E) having a water content of 0.1% by weight was obtained.

COMPARATIVE EXAMPLE 3

The same magnetic iron oxide cake as used in Comparative Example 1 was dried at 120° C. in nitrogen gas using a through flow rotary dryer, whereby a magnetic powder (F) having a water content of 0.1% by weight was obtained.

COMPARATIVE EXAMPLE 4

The same magnetic iron oxide cake as used in Comparative Example 1 was dried at 120° C. in air using a through flow chamber dryer, whereby a magnetic powder (G) having a water content of 0.1% by weight was obtained.

On the samples (A) to (G) obtained above, coercive force (Hc) and saturation magnetigation (σs) were measured according to ordinary methods. $Fe^{++}$ content (% by weight) was also measured according to a titration method using potassium bichromate. Further, angle of repose, aerated bulk density (aerated BD) and packed bulk density (packed BD) were measured using a Hosokawa powder tester, and compressibility was calculated from the following formula.

*Compressibility=(Packed BD−Aerated BD)/Packed BD*

The results are shown in Table 1.

Measurement method of angle of repose

With vibrating a standard sieve having an aperture of 710μ, a sample powder is dropped through a funnel according to a pouring method to deposit the powder on a table cup. When the shape (i.e. the angle of repose) of the deposited powder has become constant, the ridgeline of the deposited powder when seen from the front is measured using a protractor, whereby the angle of repose of the sample powder is obtained.

Measurement method of aerated BD

With vibrating a standard sieve having an aperture of 710μ, a sample powder is dropped through a chute to fill a specified container having an internal volume of 100 cc in about 20 to 30 seconds until the powder overflows the container. By horizontally sliding a blade held in a standing position, the upper surface of the container (the powder) is made flat. Then, the container plus the powder is weighed using an even balance. The aerated BD of the sample powder is obtained as (the weight of powder)/100.

Measurement method of packed BD

A specified container having an internal volume of 100 cc is provided with a cap and is placed in a tapping holder. A sample powder is filled to the top of the cap and a cap cover is applied. Tapping is conducted 180 times at a rate of one time per second. Then, in the similar manner as in the measurement of aerated BD, the upper surface of the container (the powder) is made flat using a blade, followed by weighing. The packed BD of the sample powder is obtained as (the weight of powder)/100.

Further, using each magnetic powder, blending was conducted according to the following composition. Each blend was made uniform in a ball mill to obtain a magnetic coating.

| (1) Cobalt-containing ferromagnetic iron oxide powder | 100.0 parts by weight |
| (2) Surfactant | 3.8 parts by weight |
| (3) Vinyl chloride-vinyl acetate copolymer resin | 8.0 parts by weight |
| (4) Polyurethane resin | 35.5 parts by weight |
| (5) Methyl ethyl ketone | 108.1 parts by weight |
| (6) Toluene | 108.1 parts by weight |
| (7) Cyclohexanone | 36.0 parts by weight |

Each magnetic coating was coated on a polyester film according to an ordinary method, oriented and dried to obtain a magnetic tape having a magnetic film of about 9μ in thickness. On each tape, there were measured coercive force (Hc), squareness (Br/Bm), orientability (OR), switching field distribution (SFD) and gloss of coating film (60-60° gloss) according to ordinary methods. The results are shown in Table 1.

Figure 2:
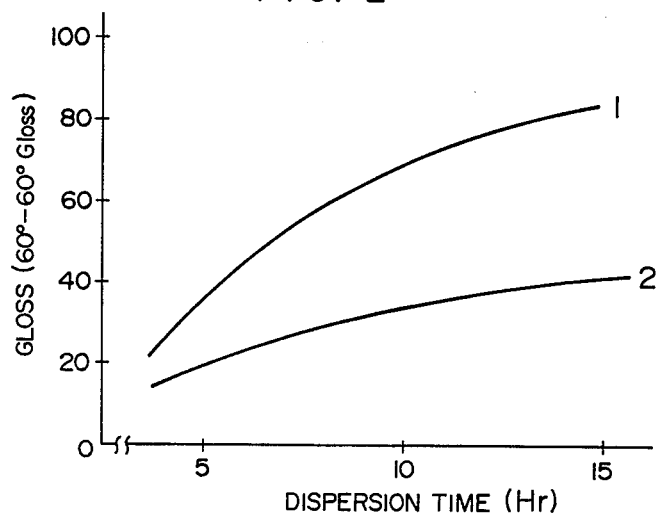
FIG. 2 is a graph showing relationship between dispersion time in binder and gloss when coated, of the magnetic powders obtained in Example 1 and Comparative Example 1.

On the magnetic powder (A) and the magnetic powder (D), there was examined a relation between dispersion time in ball mill and gloss of coating film. The results are shown in FIG. 2.

TABLE 1

| | | Powder | | | |
|---|---|---|---|---|---|
| Sample symbol | | Average particle diameter (μm) | Coercive force Hc (Oe) | Saturation magnetization σs (emu/g) | $Fe^{++}$ content (wt. %) |
| Example 1 | A | 85 | 656 | 74.9 | 3.7 |
| Example 2 | B | 83 | 656 | 74.9 | 3.7 |
| Example 3 | C | 80 | 655 | 74.8 | 3.7 |
| Comparative Example 1 | D | — | 655 | 75.0 | 3.7 |
| Comparative Example 2 | E | — | 640 | 74.9 | 3.7 |
| Comparative Example 3 | F | — | 632 | 74.7 | 3.7 |
| Comparative Example 4 | G | — | 628 | 72.5 | 1.7 |

| | | Powder Flowability | | | |
|---|---|---|---|---|---|
| Sample symbol | | Angle of repose (°) | Aerated BD (g/cm³) | Packed BD (g/cm³) | Compressibility |
| Example 1 | A | 24 | 0.61 | 0.68 | 0.103 |
| Example 2 | B | 28 | 0.59 | 0.66 | 0.106 |
| Example 3 | C | 31 | 0.60 | 0.68 | 0.118 |
| Comparative Example 1 | D | 40 | 0.49 | 0.71 | 0.310 |
| Comparative Example 2 | E | 39 | 0.58 | 0.83 | 0.301 |
| Comparative Example 3 | F | 42 | 0.56 | 0.80 | 0.300 |
| Comparative Example 4 | G | 41 | 0.49 | 0.70 | 0.310 |

| | | Magnetic tape | | | | |
|---|---|---|---|---|---|---|
| Sample symbol | | Coercive force Hc (Oe) | Squareness Br/Bm | Orientability OR | Switching field distribution SFD | 60°—60° gloss |
| Example 1 | A | 710 | 0.772 | 1.78 | 0.47 | 77.0 |
| Example 2 | B | 710 | 0.770 | 1.77 | 0.47 | 70.5 |
| Example 3 | C | 708 | 0.768 | 1.76 | 0.47 | 61.9 |
| Comparative Example 1 | D | 705 | 0.740 | 1.63 | 0.48 | 39.7 |
| Comparative Example 2 | E | 707 | 0.752 | 1.70 | 0.47 | 25.2 |
| Comparative Example 3 | F | 696 | 0.749 | 1.66 | 0.49 | 20.2 |
| Comparative Example 4 | G | 680 | 0.736 | 1.60 | 0.51 | 40.0 |

As is obvious from Table 1, the cobalt-containing ferromagnetic iron oxide powder otabined from the present invention process has excellent flowability viewed from powder flowability data and also has excellent dispersibility in resin binder viewed from magnetic tape data (gloss, squareness, orientability). Further, the iron oxide powder of the present invention obtained using hot air has the same $Fe^{++}$ content as those obtained in Comparative Examples 1 to 3 using an inert atmosphere (nitrogen), indicating that the oxidation of $Fe^+$ hardly takes place during the spray drying of the present invention process using hot air.

As is obvious from FIG. 2, the dispersion time needed to give a given gloss of coating film is much shorter in the iron oxide powder obtained from the present invention process than in the iron oxide powder obtained using an ordinary dryer. Therefore, the cost for production of a magnetic coating can be lowered significantly with the iron oxide powder of the present invention process.

As is obvious from the results of Example 3, when the dried product according to the present invention process has a high water content, the content can be reduced to a satisfactory level by conducting supplemental drying. Since this supplemental drying is an auxiliary means for removing a slight amount of water remaining, even if the drying is conducted using an ordinary dryer, the features of the magnetic iron oxide powder obtained through spray drying are not lost as long as the water content in the dried product is not too high (about 10% or higher) and is about 5%.

Figure 3:
FIG. 3 is a photograph by electron microscope (magnified 30,000x) showing the particle structure of the cobalt-containing ferromagnetic iron oxide powder used in Examples.
Figure 4:
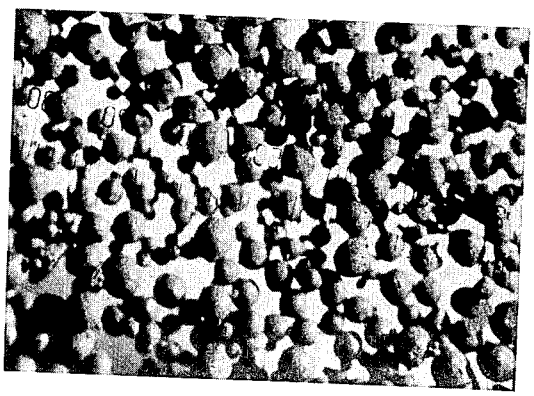
FIG. 4 and FIG. 5 are photographs by electron microscope (magnified 40x) showing the particle structures of the magnetic powders obtained in Example 1 and Comparative Example 1, respectively.
Figure 5:

There are attached to this specification, FIG. 3 [a photograph by electron microscope (30,000 magnifications) showing the crystal structure of the cobalt-containing ferromagnetic iron oxide particles used in the Examples and the Comparative Examples], FIG. 4 [a photograph by electron microscope (40 magnifications) showing the particle structure of the magnetic powder (A)] and FIG. 5 [a photograph by electron microscope (40 magnifications) showing the particle structure of the magnetic powder (D)]. It is clear that the magnetic iron oxide powder obtained from the present invention process [the magnetic powder (A)] consists of spherical particles of 5 to 200 μm in diameter.

We claim:

1. A cobalt-containing ferromagnetic iron oxide powder for use in a magnetic recording medium, said powder comprising particles consisting of an aggregate of acicular ferromagnetic iron oxide microparticles containing a cobalt compound on the surfaces thereof and having a specific surface area of at lease 30 $m^2/g$ when measured in accordance with the BET method and having an axis ratio of 3 to 15, said particles having a spherical shape measuring 5 to 200 μm in diameter, and said powder having an angle of repose of 35° or smaller.

2. The cobalt-containing ferromagnetic iron oxide powder according to claim 1, wherein the acicular ferromagnetic iron oxide microparticles further contain, on their surfaces, at least one compound of a metal selected from the group consisting of $Fe^{++}$, Mn, Zn, V, Ba and Mg.

3. The cobalt-containing ferromagnetic iron oxide powder according to claim 1, wherein the acicular ferromagnetic iron oxide microparticles have a specific surface area of 30 to 70 $m^2/g$.

4. The cobalt-containing ferromagnetic iron oxide powder according to claim 1, wherein the acicular ferromagnetic iron oxide microparticles have a specific surface area of 35 to 70 $m^2/g$.

5. The cobalt-containing ferromagnetic iron oxide powder according to claim 1 having an angle of repose of 30° or smaller.

6. A process for producing a cobalt-containing ferromagnetic iron oxide powder comprising treating acicular ferromagnetic iron oxide powder with a cobalt salt and an alkali in an aqueous liquid medium; allowing the cobalt compound to adhere to the surfaces of said powder; filtering and water-washing the resulting slurry to form acicular ferromagnetic iron oxide microparticles having a specific surface area of at least 30 $m^2/g$ when measured in accordance with the BET method and having an axis ratio of 3 to 15; spray-drying an aqueous slurry of the microparticles with hot air in a spray-dryer, the inlet temperature of the hot air in the spray-dryer being at least 150° C. and the outlet temperature of said hot air being about 60° C. to 200° C., to obtain a cobalt-containing ferromagnetic iron oxide powder comprising particles cosisting of an aggregate of acicular ferromagnetic iron oxide microparticles containing a cobalt compound on the surfaces thereof and having a specific surface area of at least 30 $m^2/g$ when measured in accordance with the BET method and having an axis ration of 3 to 15, said particles having a spherical shape meausring 5 to 200 μm in diameter, and said powder having an angle of repose of 35° or smaller.

7. A process for producing cobalt-containing ferromagnetic iron oxide powder according to claim 6, wherein the aqueous slurry that is spray-dried contains cobalt-containing ferromagnetic iron oxide microparticles in a concentration of 30 to 400 g/l.

8. The process for producing cobalt-containing ferromagnetic iron oxide powder according to claim 6, wherein the aqueous slurry that is spray-dried contains cobalt-containing ferromagnetic iron oxide microparticles in a concentration of 150 to 300 g/l.

9. The process for producing cobalt-containing ferromagnetic iron oxide powder according to claim 6, wherein the aqueous slurry is spray-dried at a discharge pressure of 2 to 30 $kg/cm^2$.

10. The process for producing cobalt-containing ferromagnetic iron oxide powder according to claim 6, wherein the aqueous slurry is spray-dried at a discharge pressure of 10 to 25 $kg/cm^2$.

11. The process for producing a cobalt-containing ferromagnetic iron oxide powder according to claim 6, wherein said outlet temperature of the hot air is 70° to 200° C.

12. The process for producing a cobalt-containing ferromagnetic iron oxide powder according to claim 6, wherein the acicular ferromagnetic iron oxide is treated with a cobalt salt and an alkali and further at least one metal salt selected from the group consisting of salts of $Fe^{++}$, Mn, Zn, V, Ba and Mg.

* * * * *